United States Patent Office 3,600,336
Patented Aug. 17, 1971

3,600,336
POLYAMIDE RESIN FOAM AND A METHOD OF PREPARING THE SAME
Hiroshi Okada and Atsushi Osakada, Ohtsu-shi, Japan, assignors to Toray Industries, Inc., Tokyo, Japan
Filed Feb. 19, 1968, Ser. No. 706,496
Claims priority, application Japan, Feb. 18, 1967, 42/10,162; May 15, 1967, 42/30,327
Int. Cl. C08g 53/10, 41/04
U.S. Cl. 260—2.5          10 Claims

ABSTRACT OF THE DISCLOSURE

A polyamide resin foam comprising a polyamide resin base cross-linked with an organic compound having in the molecule at least two reactive unsaturated double bonds. A method of preparing a polyamide resin foam which comprises uniformly mixing a polyamide with an organic compound having in the molecule at least two reactive unsaturated double bonds and a chemical foaming agent at a temperature higher than the softening point of said polyamide, irradiating said mixture with ionizing rays to effect a cross-linking of the polyamide, and heating the mixture to a temperature higher than the decomposition temperature of said foaming agent to cause foaming.

BACKGROUND OF THE INVENTION

Figure 1:
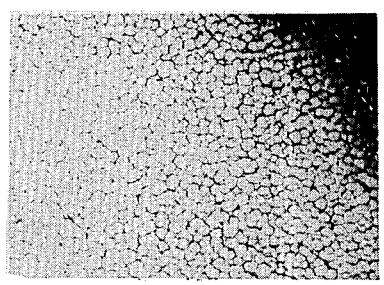

The present invention relates to a polyamide resin foam having a uniform and fine cellular structure and also to a method of preparing the polyamide resin foam.

Various methods have already been proposed for preparing polyamide resin foams. Typical examples of known methods are (1) a method wherein polyamide is cross-linked by treating with formaline, mixed with a foaming agent, and after calendering the mixture into a sheet, the polyamide sheet is continuously foamed under a normal pressure (Japanese patent publication No. 10,748/64), (2) a method wherein ε-caprolactam is rapidly polymerized while blowing therein an inert gas or evaporating an inert organic solvent to provide a foam (Japanese patent publication No. 11,074/64), and (3) wherein a polyamide solution containing a cross-linking agent or a solution of a polyamide having a reactive side chain, said solution containing a chemical foaming agent is applied to a base material followed by drying and heating, whereby foams are formed. The polyamide is simultaneously cross-linked to provide a polyamide foam-coated article (Japanese patent publication No. 6996/65).

However, although there are profitable aspects to the above-described processes, there are disadvantages connected therewith in the preparation of a polyamide foam having uniform cells and a high percentage of cells. In the case of preparing a polyamide foam by method (1) mentioned above, in order to conduct the cross-linking reaction uniformly by the formaline treatment, it is necessary to react polyamide with formaline after dissolving it in formic acid. Hence, there are problems of recovering the solvent as well as in the operation thereof. Also polyamide treated by formaline must be calendered into a sheet. Hence, it is impossible to allow a high degree of cross-linking and to obtain a polyamide foam having a uniform cellular size and a high percentage of cells. Therefore, although the polyamide foams obtained by the known methods have closed cells of 500–1000 microns in size, the cells are coarse and uneven and the density of the polyamide foam is higher than 0.4 g./cm.³ (see FIG. 2). Thus, these polyamide foams have low soundproof effects and low heat-insulating properties. Moreover, they are virtually worthless as cushion materials.

Moreover, the formaline treatment, being an amide-substituting reaction, has a deleterious effect on the mechanical properties of the polyamide.

In the case of method (2), the polyamide to be used is limited to those polyamides obtained by the polymerization of lactam and hence the filed of application is narrow. Although, by this method a polyamide foam having 500–1000 microns in cell size and 0.5–0.03 g./cm.³ in density is obtained, since a chemical foaming agent cannot be employed, the sizes of the cells formed are large and uneven. Moreover, the polyamide foams contain a considerable percentage of continuous cells, which result in reducing the soundproof and heat insulating effects and lowering markedly their value as cushion materials (see FIG. 3). Still further, since the foaming phenomena occurs during the formation of the polyamide, it is very difficult to control the conditions for the preparation of the polyamide foam and to obtain a polyamide foam having a constant foam percentage.

In method (3), the cross-linking reaction is effected by heating, that is, cross-linking is caused by a chemical reaction such as condensation and the like. Thus, it takes a considerable period of time to conduct the cross-linking reaction. Normally, it takes several hours to accomplish the cross-linking reaction sufficiently and by this cross-linking reaction a polyamide foam having 400–800 microns in cell size is obtained. However, since in this method, no foaming is conducted after cross-linking, a low density polyamide foam having a high percentage of cells is not obtained, i.e., the density is higher than 0.4 g./cm.³ and cell sizes are uneven and large (see FIG. 4). Further, in this method, a solvent for the polyamide is necessary and consequently there is the troublesome problem of solvent recovery.

Thus, it has hitherto been considered to be very difficult to prepare a polyamide foam having uniform cell sizes and a high cell percentage.

BRIEF DESCRIPTION OF THE INVENTION

The present invention relates to a polyamide resin foam composed of a polyamide resin base cross-linked by an organic compound having at least two unsaturated double bonds in the molecule.

The aforesaid polyamide resin foam of this invention is a closed cell type foam having fine cells of 10–800 microns, preferably, 50–500 microns in average cell size, 0.5–0.02 g./cm.³ in density, and more than 40% by weight in gel percentage of the polyamide base cross-linked. By "closed cell type foam" is meant a foam in which the proportion of closed cells is higher than 50% by volume.

DETAILED DESCRIPTION OF THE INVENTION

An average cell size of larger than 800 microns is not preferable since in this case, the foam thus formed has a reduced elasticity and cushion effect. Also, the mechanical properties thereof such as tensile strength, compressive strength, etc. are affected. In general, the smaller the cell sizes, the better the properties mentioned above. Further, when the polyamide foam has a density of 0.5–0.02 g./cm.³, it exhibits excellent properties as a polyamide foam. If a density of higher than 0.5 g./cm.³ is realized, properties such as, elasticity, heat insulating, cushioning effect, and soundproof properties cannot be obtained. In order to obtain these desirable properties, the density of the polyamide foam is required to be less than 0.5 g./cm.³. On the other hand, if the density is less than 0.02 g./cm.³, the cell sizes become, in general, larger and uneven, which deleteriously affect the mechanical properties of the foam, in particular, tensile strength and lower the value thereof as foam.

The gel percentage of the polyamide base is higher than 40% by volume, preferably 70–95% by weight. If the gel percentage is less than 40% by volume, the gases generated by the decomposition of the foaming agent will not be sufficiently retained in the polyamide. Hence, the density of the foam prepared becomes much higher than the value presumed from the foaming agent added. Moreover, the cell sizes become uneven. By "gel percentage" is meant the weight percent of the undissolved components of the polyamide as against the weight of the initial polyamide when the sliced polyamide tips are immersed in m-cresol of 100 times by volume of the tips for 48 hours at 25° C. and it represents the extent of cross-linking.

As polyamides in this invention, there may be employed A-type polyamides prepared by the condensation polymerization of a divalent carboxylic acid and a divalent amine, B-type polyamides prepared by the addition or condensation reaction of a lactam or a ω-aminocarboxylic acid, a copolymer type polyamide of at least two of a divalent carboxylic acid, a divalent amine, a lactam, and a ω-aminoacid, or a mixture of the aforesaid polyamides.

The aforesaid A-type polyamides and the B-type polyamides those represented by the general formulas

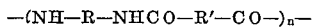

and

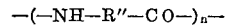

respectively, wherein R, R' and R'' each represents a divalent hydrocarbon group, a hydrocarbon group having a —NH—, —CO—, —O—, or —S— group therein, or the aforesaid hydrocarbon group having an unsaturated double bond.

Among the typical polyamides used in this invention are mentioned A-type polyamides such as polyhexamethylene adipamide, and polyhexamethylene sebacamide; B-type polyamides such as polycaprolactam and polylauryl lactam; copolymer-type polyamides such as a copolymer of ε-caprolactam and hexamethylenediammonium adipate, a copolymer of ε-caprolactam, hexamethylenediammonium adipate, hexamethylenediammonium sebacate, and the like.

The polyamide resins preferably have an intrinsic viscosity ([η]) in m-cresol at 20° C. of 0.3–4.5.

As the organic compounds having at least two unsaturated double bonds used in this invention, there are mentioned vinyl esters or allyl esters of aliphatic, aromatic or alicyclic polyhydric carboxylic acids; vinyl ethers, allyl ethers, acrylic esters, or methacrylic esters of aliphatic, aromatic, or alicyclic polyhydric alcohols; vinyl ethers, allyl esters, acryl esters or methacryl esters of polyethylene glycol; triallyl esters of cyanuric acid or unsaturated polyesters; allyl esters, acrylic esters or methacrylic esters of vinyl alcohol or allyl alcohol; diallylbenzene phosphonate; triallyl phosphate; and unsaturated compounds in which at least one of the two reactive unsaturated double bonds is a

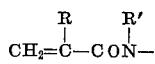

group, wherein R is a hydrogen atom or a methyl group and R' is a hydrogen atom, an alkyl group having 1–6 carbon atoms or a phenyl group.

Examples of the aforesaid organic compounds are diallyl ester of adipic acid, diallyl ester of sebacic acid, diallyl ester of maleic acid, diallyl ester of itaconic acid, diallyl ester of phthalic acid, diallyl ester of succinic acid, divinyl ether of ethylene glycol, diallyl ether of pentaerythritol, diacrylic ester of resorcinol, diallyl ether of 1,4-dichlorohexanediol, diacrylic ester of diethylene glycol, diacrylic ester of triethylene glycol, triallyl ester of cyanuric acid, acrylic ester of allyl alcohol, methacrylic ester of allyl alcohol, an unsaturated polyester of maleic acid, isophthalic acid and ethylene glycol, N,N'-methylenebisacrylamide, N,N'-methylenebismethacrylamide, N,N'-hexamethylenebisacrylamide, N,N'-pentamethylenebisacrylamide, N,N'-xylylenebisacrylamide, N,N',N'-melaminetriacrylamide, N-allylacrylamide, N-allylmethacrylamide, N,N' - diphenyl-N,N'-hexamethylenebisacrylamide, N,N'-dipropyl - N,N' - hexamethyleneacrylamide, and the like.

Compounds having a

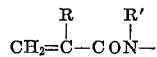

group are preferable from the standpoint of conducting a uniform cross-linking reaction. In particular, those unsaturated compounds having larger proportions of said groups are more preferable.

The polyamide resin foam of this invention is prepared by a method whereby the aforesaid polyamide is uniformly kneaded with the organic compound having at least two reactive unsaturated double bonds in the molecule and a chemical foaming agent at a temperature higher than the softening point of the polyamide. The mixture is irradiated with ionizing rays to effect cross-linking of the polyamide. The mixture is then heated to a temperature higher than the decomposition point of the foaming agent.

The amount of the unsaturated compound employed is influenced by the degree of irradiation with ionizing rays such as electron rays or gamma rays. In general, the amount of unsaturated compound is 0.1–20% by weight preferably 2–10% by weight to the weight of the polyamide.

The amount of the unsaturated compound is less than 0.1% by weight, the cross-linking does not occur sufficiently. Hence, the cell sizes of the polyamide resin foam obtained are large and the foaming percentage is low. On the other hand, if the amount is higher than 20% by weight, no additional effects are obtained, which is desirable from an economical viewpoint.

The unsaturated compound mentioned above acts as a cross-linking promotor in the cross-linking of polyamides by irradiation with ionizing rays. The high and uniform cross-linking can be conducted by the irradiation of ionizing rays in an amount of 1/10–1/30 of the amount necessary for conducting the cross-linking in the absence of unsaturated compound. Also, by the addition of the unsaturated compound a polyamide foam having a uniform cell distribution and a high foaming percentage can be obtained.

In the method of this invention, a chemical foaming agent capable of forming gases by the decomposition thereof and having a decomposition temperature higher than the softening point of the polyamide is employed. In the case of using an azo-type chemical foaming agent, it is preferable to employ a chemical foaming agent having a decomposition point of 20–30° C. higher than the softening point of the polyamide to be employed as these chemical foaming agents reduce the decomposition point 20–30° C. in polyamides.

As typical foaming agents, there are mentioned azodicarbonamide, hydrazodicarbonamide, azocarboxylic acid ester, barium azodicarboxylate, 4,4'-oxybis(benzenesulfonylsemicarbizide), bisbenzenesulfonylhydrazide, dinitrosopentamethylenetetramine, trihydrazino-sym-triazine, and the like.

The amount of the foaming agent is influenced by the desired foaming percentage and the nature of the foaming agent to be employed. In general, amounts in the range of 0.5–20% by weight are used.

A decomposition promotor for the foaming agent, such as zinc oxide may be employed if necessary.

In kneading the polyamide and the above-stated additives, other additives may be added such as pigments, antistatic agents, plasticizers, reinforcing agents, antiweathering agents, and nucleating agents, together with a small amount of a bodying agent such as polyethylene, polypropylene, polyester, polyacrylic acid, polyacrylic ester, polyether, polyvinyl acetate, polyurethane, polyester amide, or a rubber.

In the practice of the method of this invention, the aforesaid polyamide is first uniformly kneaded with the unsaturated compound and the foaming agent as mentioned above together with, if necessary, the above additives. The temperature for kneading must be higher than the softening point of the polyamide and lower than the decomposition point of the foaming agent, but when additives such as plasticizers (e.g. a lactam) is added to the polyamide, the temperature may be higher than the softening point of the polyamide mixture.

The kneading procedure may be conducted by any known method but for preventing the polyamide from being oxidized, it is preferable to conduct the kneading in an inert gas atmosphere or in a closed system and, in particular, it is most preferable to conduct the kneading using an extruding machine. Moreover, in view of the subsequent irradiation with ionizing rays, the kneaded mixture is preferably molded into sheets or filaments or is coated on the surface of a support to form a thin film. The thickness of the sheet or film is preferably less than about one cm. in the case of employing electron rays.

Thus, a molded polyamide mixture was irradiated with ionizing rays, such as electron rays, neutron rays, alpha rays, gamma rays, and X-rays. Electron rays generated by means of a Van de Graaff accelerator, a linear accelerator, a Capacitron type accelerator, or a resonance transformer type accelerator or gamma rays from $^{60}$Co or $^{137}$Cs are particularly effective. The amount of irradiation is varied according to the desired degree of foaming and the amount of the unsaturated compound. In general, an amount of 0.5–30 megarad of irradiation is sufficient. However, in the case of producing a particularly high degree of cross-linking, a higher dose may be employed. The irradiation with ionizing rays is usually conducted in the air. If necessary, however, it may be carried out in a vacuum, in an inert gas or in water. By conducting the irradiation with ionizing rays as in the aforesaid manner, the gel percentage in the polyamide resin can be increased higher than 40% by weight.

The foamable polyamide composition thus prepared is foamed according to any known foaming method employed in the case of foaming foamed materials by using chemical foaming agents. As the preferred mode of foaming in the method of this invention, the molded polyamide composition thus prepared is foamed in an atmosphere or heating bath heated to a temperature higher than the decomposition point of the foaming agent under normal pressure or the foamable molding such as sheet or filament is heated on a heating bath and irradiated from above by infra-red rays. Also, a method may be employed wherein the kneaded mixture is molded by heating under pressure and foamed by releasing the pressure. The foaming temperature is higher than the decomposition point of the foaming agent as mentioned above and is usually lower than 350° C. If the foaming temperature is higher than 350° C., the decomposition and coloring of the polyamide occurs. Also, the production of a polyamide foam having uniform cell sizes and a high foaming percentage becomes difficult.

By the method of this invention as mentioned above, a polyamide foam can be obtained having an average cell size of 10–800 microns, 0.5–0.02 g./cm.$^3$ in density, uniform cell sizes, a high foaming percentage, and closed cells. The polyamide foam thus obtained has excellent mechanical properties such as elasticity, cushion properties, heat-insulating properties, soundproof properties, and tensile strength.

It has hitherto been considered difficult to obtain polyamide foams having uniform cell size distribution and a high foaming percentage.

To facilitate the understanding of the present invention, the following non-limiting examples are presented:

Example 1

A mixture of 100 parts by weight of a copolymer (intrinsic viscosity ($[\eta]$) thereof in m-cresol at 20° C. being 0.80) of ε-caprolactam and hexamethylenediammonium adipate (weight ratio 40:60), 10 parts by weight of azodicarbonamide, and 6 parts by weight of diallylphthalate was uniformly kneaded on a roll heated to 160° C. The kneaded mixture was molded into a sheet of 2 mm. in thickness by means of a press heated to 165° C. and then the sheet was irradiated by electron rays from a Van de Graaff type accelerator in an amount of 10 mega-rad from one side of the sheet. The gel percentage of the polyamide sheet thus irradiated was 92%. When the sheet was immersed in a silicone bath heated to 200–210° C., the sheet was foamed to provide a uniformly foamed flexible sheet of about 5 mm. in thickness, 0.076 g./cm.$^3$ and 200–300 microns in cell sizes.

Example 2

A mixture of 100 parts by weight of a copolymer ($[\eta]=0.80$) of ε-caprolactam and hexamethylenediammonium adipate (weight ratio 40:60), 10 parts by weight of barium azodicarbonate, and 6 parts by weight of diallyl maleate was kneaded by means of an extruding machine heated to 170–180° C. and then molded into a continuous sheet of 2.5 mm. in thickness by means of a T-die heated to 170–180° C. The sheet was then irradiated from one side thereof by electron rays from a Van de Graaff type accelerator in a amount of 8 mega-rad in the air and then the sheet (gel percentage of 87% weight) thus irradiated was foamed by floating on a salt bath heated to 220–240° C. The polyamide foam prepared had uniform cells of 300–400 microns in size and 0.108 g./cm.$^3$ in density.

Example 3

A mixture of 100 parts of polylauryllactam powders ($[\eta]=0.89$), 8 parts by weight of trihydrazino-sym-triazine, and 8 parts by weight of a diacryl ester of diethylene glycol was mixed uniformly by means of a Henchel mixer and then molded into a sheet of 1 mm. in thickness by means of a press heated to 200° C. Thereafter, the sheet was irradiated from one side thereof by gamma rays from $^{60}$Co in an amount of 6 megra-rad to conduct cross-linking of the composition and then immersed in a salt bath heated to 270–290° to cause foaming. The gel percentage of the sheet irradiated was 90% by weight. The polylaurylamide foam thus obtained had 200–300 microns in cell sizes and 0.095 g./cm.$^3$ in density.

Example 4

A mixture of 100 parts by weight of polycaprolactam ($[\eta]=1.05$), 8 parts by weight of trihydrozino-sym-triazine, and 6 parts by weight of triallyl ester of cyanuric acid was uniformly kneaded by means of a roll kneader to 210–215° C. Then, the mixture was molded into a sheet of 2 mm. in thickness by means of a press mold heated to 210–215° C. The sheet was irradiated from one side thereof by electron beams from a Van de Graaff type accelerator in an amount of 10 mega-rad, heated in a closed press under pressure to 270–290° C., and the pressure was released from the press to cause foaming. The gel percentage of the sheet irradiated by electron beams was 90% by weight. The polycaproamide sheet thus foamed was about 5 mm. in thickness and had uniform cells of 150–200 microns in size, a high foaming percentage, a density of 0.088 g./cm.$^3$, and a good elasticity.

Example 5

A mixture of 100 parts by weight of a copolymer (M.P.=115° C., $[\eta]=1.02$) composed of ε-caprolactam, hexamethylenediammonium adipate and lauryl lactam, 8 parts by weight of azodicarbonamide and 6 parts by weight of diacryl adipate was kneaded by means of an extruding machine heated to 125–130° C. and extruded into a sheet of about 3 mm. in thickness through a T-die. The sheet was then irradiated from both sides thereof by electron rays from a Van de Graaff accelerator in an amount of 8 mega-rad each, whereby the gel percentage of the copolymer reached 99% by weight. When heated on a salt bath having 200–220° C. in temperature, the copolymer was foamed to provide a uniform copolymer foam having 0.067 g./cm.³ and 200–300 microns in cell size.

Example 6

The procedure as in Example 5 was repeated while using diacryl sebacate instead of diacryl adipate to provide a copolymer foam having 85% by weight in gel percentage, 0.075 g./cm.³ in density, and 200–300 microns in cell size.

Example 7

The same procedure as in Example 5 was repeated while using diacryl succinate instead of diacryl adipate to provide a uniform copolymer foam having 90% by weight in gel percentage, 0.070 in density and 150–300 microns in cell size.

Example 8

A mixture of 100 parts by weight of a copolymer (M.P.=160° C., $[\eta]$=0.90) composed of ε-caprolactam, hexamethylenediammonium adipate and lauryl lactam, 10 parts by weight of azodicarbonamide, 6 parts by weight of diacryl itaconate was uniformly kneaded on a roll heated to about 120° C. The kneaded mixture was sliced and molded into a sheet of 2 mm. in thickness by means of a press heated to about 130° C. The sheet was irradiated from both sides thereof by electron beams from a Van de Graaff type accelerator in an amount of 12 mega-rad whereby the gel percentage of the polymer reached 72% by weight. The sheet thus irradiated was then heated on a salt bath heated to 200–220° C. to cause foaming in the copolymer and to provide a uniformly foamed copolymer having 0.032 g./cm.³ in density and 200–300 microns in cell size.

Example 9

The same procedure as in Example 8 was repeated while using a diacryl ester of ethylene glycol instead of diacryl itaconate to provide a uniformly foamed copolymer having 90% by weight in gel percentage, 0.036 g./cm.³ in density and 250–350 microns in cell size.

Example 10

The same procedure as in Example 8 was repeated while using 3 parts by weight of diacryl phthalate and 3 parts by weight of diacryl sebacate instead of diacryl itaconate to provide a uniformly foamed copolymer having 88% by weight in gel percentage, 0.030 g./cm.³ in density and 200–300 microns in cell size.

Example 11

A mixture of 100 parts by weight powdered copolymer (M.P.=160° C. $[\eta]$=0.90) composed of ε-caprolactam, hexamethyleneammonium adipate and hexamethyleneammonium sebacate, 6 parts by weight of N,N'-methylenebisacrylamide, and 10 parts by weight of azodicarbonamide was uniformly mixed in a mortar and molded into a sheet of about 2 mm. in thickness by means of a press heated to 165–170° C. The sheet was irradiated from one side thereof by electron rays from a Van de Graaff type accelerator in an amount of 12 mega-rad in the air to conduct high and uniform cross-linking reaction and then heated on a silicone bath of 210–220° C. to cause foaming. By the procedure was obtained a uniform and fine-cellular copolymer foam having 0.042 g./cm.³ in density, 100–300 microns in cell size and 88% by weight in gel percentage.

Example 12

A mixture of 100 parts by weight of powdered copolymer (M.P.=170° C., $[\eta]$=0.80) composed of ε-caprolactam and hexamethylenediammondium adipate, 4 parts by weight of N,N'-hexamethylenebisacrylamide and 10 parts by weight of hydrazodicarbonamide was stirred for three minutes in a Henschel mixer uniformly and was molded into a sheet of about 4 mm. in thickness by means of a press heated to 175–180° C. as in Example 11. Thereafter, the sheet was irradiated from one side thereof by electron beams from a Van de Graaff accelerator in an amount of 8 mega-rad to conduct highly and uniformly cross-linking. The gell percentage of the copolymer was 72% by weight. When the copolymer sheet was heated in a silicone bath heated to 210–220° C., the copolymer was foamed to provide a fine-cellular flexible copolymer having 200–300 microns in cell size and about 0.085 g./cm.³ in density.

Example 13

A uniform mixture of 100 parts by weight of powdered polylauryl lactam ($[\eta]$=0.89), 15 parts by weight of barium azodicarboxylate, and 6 parts by weight of N,N'-phenylenebismethacrylate was molded into a sheet of about 5 mm. in thickness by means of a press mold heated to 180–185° C. The sheet was then irradiated from one side thereof by electron rays from a Van de Graaff accelerator in an amount of 8 mega-rad to conduct high cross-linking and to provide a polyamide composition having 78% in gel percentage. When the sheet was heated in a silicone bath heated to 230–240° C., the polymer was foamed uniformly to provide a polymer foam having fine cells (about 50–200 microns in cell size) and 0.075 g./cm.³ in density.

Example 14

A mixture of 100 parts by weight of a copolymer (M.P.=115° C., $[\eta]$=1.02)

composed of ε-caprolactam, hexamethylenediammonium adipate, and lauryl lactam, 10 parts by weight of 4,4'-oxy-bis(benzenesulfonylsemicarbazide), and 6 parts by weight of N-methyl-N-allylacrylamide was kneaded by means of an extruding machine heated to 130–135° C. and then molded into a sheet of 4 mm. in thickness through a T-die. Then, the sheet was irradiated from both sides thereof by electron rays from a Van de Graaff accelerator in an amount of 12 mega-rad. By the irradiation, the gel percentage of the cross-linked copolymer reached 92%. The sheet was passed through a silicone bath heated to 190–200° C. and shielded by a nitrogen gas to cause foaming. Thus, a uniform and flexible fine-cellular copolymer foam having 50–150 microns in cell size, 0.044 g./cm.³ in density was obtained. The microscopic photograph ×12 of the sample is shown in FIG. 1 of the accompanying drawings.

In addition, for comparison, a control test was conducted by irradiating the molded sheet of the composition by light from an arc lamp instead of irradiating by electron rays. In this case, the gel percentage of the copolymer reached only about 35% when the irradiation was continued for a long period of time and also a copolymer foam prepared by foaming the sheet was quite hard. The cell sizes of the foam were small (500–1000 microns) but the sizes of the cells increased gradually to the thickness direction and the uniformity of the cell distribution was very bad. The density thereof was at most 0.115 g./cm.³. Moreover, since the central portion of the sheet was not cross-linked, the foamed sheet was separated into two portions at the un-cross-linked portion and hence the thickness of the foamed sheet was 2–3 mm.

Example 15

A mixture of 100 parts by weight of the copolymer having the same composition as in Example 14, 6 parts by weight of N,N'-methylenebisacrylamide, and 10 parts by weight of azodicarbonamide was kneaded by using an extruding machine heated to 130–135° C. and molded into a sheet of about 2 mm. in thickness. The sheet was then irradiated from one side thereof by gamma rays from $^{60}$Co in an amount of 10 mega-rad to form a cross-linked copolymer sheet having a gel percentage of 88%. The sheet was heated in a silicone bath of 200–220° C. to cause foaming and thereafter the silicone was washed away by acetone. By this procedure, a white and uniform polyamide copolymer foam of 200–300 microns in cell size and 0.041 g./cm.³ in density was obtained.

Control Example 1

For comparison, a polyamide foam was prepared by the method disclosed in Japanese Patent No. 10,748/64, which is one of method (1) mentioned above.

Figure 2:
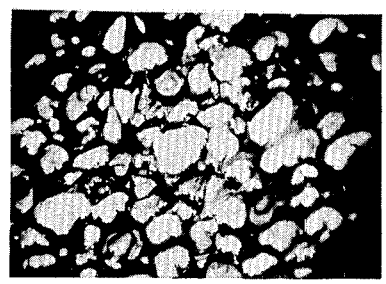

That is, 100 parts by weight of nylon 6 denatured by methanol and Formalin and having a N-methoxymethylated degree of 27% was mixed with 200 parts by weight of a vinyl acetate-vinyl chloride copolymer, 20 parts by weight of p-toluenesulfonamide, 0.5 part by weight of cadmium stearate and 8 parts by weight of azodicarbonamide. The mixture was kneaded uniformly by means of a kneading roll heated to 130–135° C. and molded into a sheet of 1 mm. in thickness through a calendar roll. The sheet was then heat-treated for about five minutes at 145° C. to conduct sufficiently cross-linking and then heated in a silicone bath of 180–190° C. to cause foaming and to provide a polyamide foam. The microscopic photograph (×26) of the sample is shown in FIG. 2 of the accompanying drawing. As is clear from FIG. 2, the cell sizes of the foam were uneven and large and hence as compared with the foams of the present invention, the foam thus obtained was inferior in heat-insulating properties and soundproof properties as well as being low in value as a cushion material.

Control Example 2

For comparison, a polyamide foam was prepared by the method disclosed in Japanese Patent No. 11,074/64 which is one of method (2) mentioned above.

That is, 9072 g. of pure commercially available ε-caprolactam was sparged for 30 minutes at 130° C. by passing through the molten caprolactam dry nitrogen at a rate of 1 liter/min. per 1 pound of the caprolactam to provide dry caprolactam.

The dry caprolactam (9072 g.) was heated to 100° C. while being protected from water and oxygen, mixed with 86.5 g. of sodium methylate and sparged for 45 minutes at 100° C. by using nitrogen of 1 liter/min. per 1 pound of the caprolactam to provide a caprolactam mixture (2%) added with a catalyst. While reducing the pressure from normal pressure to about 125 mm., the mixture was subjected to degassing for 20 minutes at 100° C. By reaction with the strong base, the iminium salt of caprolactam was formed. The iminium salt was used as a promotor for polymerization.

A mixture of 40 g. of dry caprolactam, 40 g. of the catalyst-added caprolactam, and 24 g. of potassium stearate was placed in a Pyrex test tube of 38 mm. x 300 mm. and heated to 150° C. in an oil bath. Thus, obtained molten mixture containing about 1% catalyst was mixed with 0.7 g. of a mixture of 1 mol of methylenebis(4-phenylisocyanate) and 2 mols of caprolactam. By continuing the sparge of the mixture for 10 seconds by dry nitrogen, the promotor was completely mixed thereto. Then, 65 g. of toluene (foaming agent) was added to the system and after sparging for 35 seconds, a sparging pipe was raised in the test tube above the level of the mixture in the test tube and a nitrogen gas was passed for a further fifteen minutes through the pipe to release oxygen on the reaction mixture. After 15 minutes, the solidified spongy polycaprolactam was cooled and withdrawn from the test tube.

Figure 3:
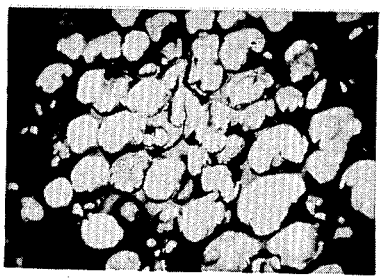

The density of the foam obtained was 0.0418 g./cm.³. The microscopic photograph (×26) of the sample is shown in FIG. 3. By the procedure, a foam having a considerably small cell size was obtained, but the cells were large and uneven and the proportion of continuous cells was large. Thus, as compared with the foams of this invention, the foam obtained was inferior in soundproof properties and heat-insulating properties as well as low in mechanical properties.

Control Example 3

A polyamide foam was prepared by the method disclosed in Japanese Patent No. 6996/65, which is an example of method (3) for comparison.

In 300 parts by weight of methanol was dissolved 100 parts by weight of N-methoxymethylated polycaprolactam (methoxylated degree 27 mol percent) by heating and the solution was mixed with 8 parts by weight of azodicarbonamide (foaming agent), 1 part by weight of phenyl-β-naphthylamine (stabilizer), 0.05 part by weight of ammonium phosphate (catalyst), and two parts by weight of copper phthalocyanine blue (coloring matter) followed by kneading. The kneaded composition was applied to a non-woven cloth to form a film of 0.3 mm. in thickness and dried. The sheet was heated for two minutes to 150° C. Thus, the foaming agent was decomposed to form foams and at the same time the softened and molten N-methocymethylated polyamide was cross-linked. The microscopic photograph (×26) of the sample is shown in FIG. 4.

Figure 4:
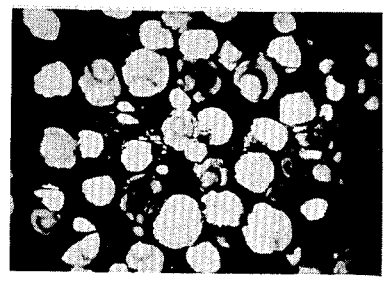

In this case, the foaming percentage of the foam thus obtained was much lower than the value anticipated by the amount of the foaming agent and as clear from FIG. 4, the cell sizes were large and uneven. Thus, by the procedure of the control example, a polyamide foam having uniform cell distribution and a high foaming percentage was not obtained.

Example 16

A uniform mixture of 100 parts by weight of a powdered copolymer ($[\eta]=0.80$) composed of ε-caprolactam and hexamethylenediammonium diadipate, 10 parts by weight of azodicarbonamide, and 10 parts by weight of N, N' - diphenyl - N,N' - hexamethylenebisacrylamide was molded into a sheet of 1 mm. in thickness by using a press mold heated to 170–175° C. The sheet was irradiated from both sides thereof by electron rays from a Van de Graaff acelerator in an amount of 12 mega-rad. The sheet thus processed had a gel percentage of 75% by weight. When the sheet was foamed in a salt bath of 200–220° C., the copolymer was foamed and a copolymer foam of 0.037 g./cm.³ in density and 200–300 microns in cell size was obtained.

Example 17

The same procedure as in Example 5 was repeated while using 10 parts by weight of N,N'-dipropyl-N,N'-hexamethylbisacrylamide instead of diacryl adipate to provide a polyamide foam having 85% by weight in gel percentage, 0.072 g./cm.³ in density and uniform cell sizes of 150–250 microns.

Example 18

A mixture of 40 parts by weight of a copolymer ($[\eta]=0.80$) composed of ε-caprolactam and hexamethylenediammonium adipate, 10 parts by weight of a copolymer ($[\eta]=1.02$) composed of ε-caprolactam, hexamethylenediammonium adipate, and lauryl lactam, 10 parts by weight of N,N'-dinitrosopentamethylene tetramine, and 1 part by weight of diacrylphthalate was sufficiently kneaded by means of a roll heated to about 120° C., sliced one, and molded into a sheet of about 1 mm. in thickness by means of a press mold heated to 130–135° C. The sheet was irradiated from both sides of the sheet by electron rays from a Van de Graaff accelerator, whereby the gel percentage of the copolymer reached 90% by weight. When the sheet was heated in a silicon bath of 200–220° C., the copolymer was foamed to provide a polyamide foam having 0.031 g./cm.³ in density and uniform cell sizes of 200–350 microns.

Example 19

The same procedure as in Example 5 was repeated while using a mixture of 100 parts by weight of a copolymer ($[\eta]=1.02$) composed of ε-caprolactam, hexamethylenediammonium adipate, and lauryl lactam, 8 parts by weight of diacryl maleate, 5 parts by weight of azodicarbonamide and 5 parts by weight of N,N'-dinitropentamethylene tetramine to provide a uniformly foamed polyamide having 97% by weight in gel percentage, 0.030 g./cm.³ in density, and 200–250 microns in cell size.

What is claimed is:

1. A polyamide resin foam having an average cell size of from 10 to 800 microns and a density of from 0.5 to 0.02 gram per cubic centimeter prepared from a cross-linked polyamide resin comprising a polyamide resin base selected from the group consisting of polylauryl lactam, polycaprolactam, a copolymer of ε-caprolactam and hexamethylenediammonium adipate, a ternary copolymer of ε-caprolactam, hexamethylenediammonium adipate, and hexamethylenediammonium sebacate, a ternary copolymer of ε-caprolactam, hexamethylenediammonium adipate, and lauryl lactam; cross-linked with an organic compound having at least two reactive unsaturated double bonds and selected from the group consisting of diallyl phthalate, diallyl maleate, diallyl adipate, diallyl sebacate, diallyl succinate, diallyl itaconate, diacrylic ester of diethylene glycol, triacryl ester of cyanuric acid, N,N'-methylenebisacrylamide, N,N' - hexamethylene-bisacrylamide, N,N' - phenylenebismethacrylamide, N-methyl-N-allylacrylamide, N,N' - diphenyl-N,N'-hexamethylenebisacrylamide, and N,N' - dipropyl-N,N'-hexamethylene-bisacrylamide, said cross-linked polyamide resin having a gel percentage of at least 40% by weight.

2. The polyamide resin foam as claimed in claim 1 wherein the average cell size of said foam is 50–500 microns and the density thereof is 0.5–0.02 g./cm.³.

3. The polyamide resin foam as claimed in claim 1 wherein the gel percentage of the cross-linked polyamide resin is 70–95% by weight.

4. A method of preparing a polyamide resin foam having a gel percentage of at least 40% by weight which comprises uniformly mixing a polyamide selected from the group consisting of a polymer prepared by the condensation polymerization of a divalent carboxylic acid and a divalent amine, a polymer prepared by the addition reaction of a lactam, a polymer of an omega-amino-carboxylic acid, a copolymer of at least two components selected from the group consisting of (a) a divalent carboxylic acid and a divalent amine, (b) a lactam, and (c) an omega-amino acid, and a mixture of the aforesaid polymers, with from 0.1–20% by weight based on the polyamide of an organic compound having in the molecule at least 2 reactive unsaturated double bonds selected from the group consisting of diallyl phthalate, diallyl maleate, diallyl adipate, diallyl sebacate, diallyl succinate, diallyl itaconate, diacrylic ester of diethylene glycol, triacryl ester of cyanuric acid, N,N' - methylenebisacrylamide, N,N'-hexamethylenebisacrylamide, N,N' - phenylenebismethacrylamide, N-methyl-N-allylacrylamide, N,N'-diphenyl-N, N'-hexamethylenebisacrylamide, and N,N'-dipropyl-N,N'-hexamethylenebisacrylamide and a chemical foaming agent at a temperature higher than the softening point of said polyamide, irradiating said mixture with ionizing rays in an amount of from 0.5–30 mega-rads to effect a cross-linking of the polyamide, and heating the mixtures to a temperature higher than the decomposition temperature of said foaming agent to cause foaming.

5. The method as claimed in claim 4, wherein said polyamide resin foam has an average cell size of from 10–800 microns and a density of from 0.5 to 0.02 gram/cm.².

6. The method as claimed in claim 4 wherein said polyamide is selected from the group consisting of polylauryl-lactam, polycaprolactam, a copolymer of ε-caprolactam and hexamethylenediammonium adipate, a ternary copolymer of ε-caprolactam and hexamethylenediammonium adipate, and lauryl lactam.

7. The method as claimed in claim 4 wherein the amount of said organic compound is 2–10% by weight to the weight of the polyamide.

8. The method as claimed in claim 4 wherein said chemical foaming agent is selected from the group consisting of azodicarboxylic acid amide, barium azodicarboxylate, hydroazodicarboxylic acid amide, trihydrazino-sym-triazine, 4,4'-oxybis (benzenesulfonylsemicarbazide), and N,N'-dinitrosopentamethylenetetramine.

9. The method as claimed in claim 4 wherein foaming is conducted at a temperature higher than the decomposition point of the foaming agent and at a normal pressure.

10. The method as claimed in claim 4 wherein foaming is conducted by heating at a temperature higher than the decomposition point of the foaming agent and under pressure and then releasing the pressure to cause foaming.

References Cited

UNITED STATES PATENTS

| 2,283,316 | 5/1942 | Cooper et al. | 260—2.5N |
| 2,965,553 | 12/1960 | Dixon et al. | 204—159.15 |
| 3,065,189 | 11/1962 | Becke et al. | 260—2.5N |
| 3,115,418 | 12/1963 | Magat et al. | 204—159.15 |
| 3,282,864 | 11/1966 | Bost et al. | 260—2.5 |
| 3,413,244 | 11/1968 | Landler et al. | 260—2.5 |
| 3,471,386 | 10/1969 | D'Alelio | 204—159.15 |

JOHN C. BLEUTGE, Primary Examiner

U.S. Cl. X.R.

204—159.15; 260—857